(12) United States Patent
Lassesen

(10) Patent No.: US 11,873,793 B2
(45) Date of Patent: Jan. 16, 2024

(54) FLANGE ELEMENT, A FLANGE CONNECTION COMPRISING SUCH FLANGE ELEMENTS AND A TOWER STRUCTURE

(71) Applicant: TP-Products AS, Drammen (NO)

(72) Inventor: Sjur Lassesen, Stabekk (NO)

(73) Assignee: TP-Products AS, Drammen (NO)

( * ) Notice: Subject to any disclaimer, the term of this patent is extended or adjusted under 35 U.S.C. 154(b) by 383 days.

(21) Appl. No.: 17/290,546

(22) PCT Filed: Oct. 24, 2019

(86) PCT No.: PCT/EP2019/078966
§ 371 (c)(1),
(2) Date: Apr. 30, 2021

(87) PCT Pub. No.: WO2020/089020
PCT Pub. Date: May 7, 2020

(65) Prior Publication Data
US 2022/0010779 A1   Jan. 13, 2022

(30) Foreign Application Priority Data
Nov. 2, 2018   (NO) .................................. 20181410

(51) Int. Cl.
*E04H 12/00*   (2006.01)
*F03D 13/25*   (2016.01)
(Continued)

(52) U.S. Cl.
CPC ........... *F03D 13/25* (2016.05); *E04H 12/085* (2013.01); *E04H 12/34* (2013.01); *F05B 2240/912* (2013.01); *F05B 2260/301* (2013.01)

(58) Field of Classification Search
CPC ....... E04H 12/085; E04H 12/34; E04H 12/00; F03D 13/25; F03D 13/201; F03D 13/203;
(Continued)

(56) References Cited

U.S. PATENT DOCUMENTS 2,401,923 A * 6/1946 Gleeson .................. F16L 17/08
220/327
2,617,672 A * 11/1952 Nichols ..................... F16D 1/05
403/183
(Continued)

FOREIGN PATENT DOCUMENTS

CN      201401295 Y  *  2/2010  ........... E04H 12/085
DE      10152018 A1  *  4/2003  ........... E04H 12/085
(Continued)

OTHER PUBLICATIONS

N.L. Pedersen "Design of Bolted L-Flanged Connections" Technical University of Denmark; NSCM-29; 2016 (5 pages).
(Continued)

*Primary Examiner* — Chi Q Nguyen
(74) *Attorney, Agent, or Firm* — Osha Bergman Watanabe & Burton LLP

(57) ABSTRACT

A flange element for a flange connection with a longitudinal centre axis A includes a flange part and an attachment part. The flange part has a front side with a front surface. The attachment part is adapted for secure attachment to a tubular element comprising a tower section of the tower structure for a wind turbine or a pipe element that is part of an offshare load bearing structure. The flange part is arranged radially on the inside of the flange element and is provided with a flange wedge. The flange wedge includes a flange wedge surface that is part of the front surface, and a flange heel including a flange heel surface that is part of the front surface. The flange wedge surface makes a wedge surface angle $\alpha 1$ and the flange heel surface makes a heel surface (Continued)

angle β with a plane P that is perpendicular to the longitudinal centre axis A of the flange element.

21 Claims, 9 Drawing Sheets

(51) Int. Cl.
*E04H 12/08* (2006.01)
*E04H 12/34* (2006.01)

(58) Field of Classification Search
CPC .......... F03D 13/2005; F03D 13/20; F05B 2204/912; F05B 2260/301
See application file for complete search history.

(56) References Cited

U.S. PATENT DOCUMENTS

| | | | | | |
|---|---|---|---|---|---|
| 2,739,828 | A | * | 3/1956 | Schindler | F16L 23/12 285/422 |
| 2,940,779 | A | * | 6/1960 | Del Buono | F16L 23/032 403/183 |
| 3,214,201 | A | * | 10/1965 | Fonda | F16L 23/02 277/614 |
| 3,771,817 | A | * | 11/1973 | Schnabel | F16L 23/125 285/55 |
| 4,183,562 | A | * | 1/1980 | Watkins | F16L 23/032 285/23 |
| 5,230,540 | A | * | 7/1993 | Lewis | F16L 23/162 285/368 |
| 6,470,645 | B1 | | 10/2002 | Maliszewski et al. | |
| 6,532,700 | B1 | * | 3/2003 | Maliszewski | F03D 13/10 174/45 R |
| 7,096,639 | B2 | * | 8/2006 | Wobben | F03D 13/10 52/741.15 |
| 7,621,049 | B2 | * | 11/2009 | Wobben | F03D 1/065 29/897 |
| 7,665,273 | B2 | * | 2/2010 | Fuellhaas | F03D 13/20 52/745.04 |
| 8,046,902 | B2 | * | 11/2011 | Wobben | E04H 12/08 29/557 |
| 8,313,264 | B2 | * | 11/2012 | Webjorn | F16L 23/032 285/368 |
| 8,490,337 | B2 | * | 7/2013 | Word, III | E04H 12/085 52/584.1 |
| 10,520,120 | B2 | * | 12/2019 | Fraczek | E21B 17/04 |
| 2004/0112002 | A1 | | 6/2004 | Wobben | |
| 2006/0000185 | A1 | | 1/2006 | Wobben | |
| 2010/0117353 | A1 | | 5/2010 | Ma | |
| 2010/0126079 | A1 | | 5/2010 | Kristensen | |
| 2010/0307097 | A1 | | 12/2010 | Word, III et al. | |
| 2011/0131898 | A1 | | 6/2011 | Nies et al. | |
| 2011/0135492 | A1 | | 6/2011 | Tetambe et al. | |
| 2012/0317918 | A1 | * | 12/2012 | Rasmussen | E04H 12/08 29/897.3 |
| 2014/0230343 | A1 | * | 8/2014 | Lam | F03D 13/20 52/40 |

FOREIGN PATENT DOCUMENTS

| | | | | |
|---|---|---|---|---|
| DE | 202008006307 | U1 | | 9/2009 |
| DE | 102011077428 | A1 | * | 12/2012 .......... E04H 12/085 |
| DE | 202013010214 | U1 | * | 12/2014 .......... E04H 12/085 |
| DE | 102017125060 | A1 | * | 5/2019 .......... E04H 12/085 |
| EP | 1318300 | A1 | | 6/2003 |
| EP | 2116675 | A2 | | 11/2009 |
| EP | 2535485 | A1 | * | 12/2012 ............. E04H 12/08 |
| EP | 2767654 | A1 | * | 8/2014 .......... E04H 12/085 |
| EP | 3219876 | A1 | | 9/2017 |
| FR | 1563983 | A | * | 4/1969 .......... E04H 12/085 |
| JP | 2000265571 | A | | 9/2000 |
| JP | 2002021194 | A | * | 1/2002 .......... E04H 12/085 |
| NO | 177160 | C | | 7/1995 |
| NO | 321675 | B1 | | 6/2006 |
| WO | 9317268 | A1 | | 9/1993 |
| WO | 2007059768 | A1 | | 5/2007 |
| WO | 2016066659 | A1 | | 5/2016 |

OTHER PUBLICATIONS

Search Report issued in Norwegian Application No. 20181410; dated May 27, 2019 (2 pages).
International Search Report issued in International Application No. PCT/EP2019/078966, dated Feb. 3, 2020 (4 pages).
Written Opinion issued in International Application No. PCT/EP2019/078966; dated Feb. 3, 2020 (6 pages).
International Preliminary Report on Patentability issued in International Application No. PCT/EP2019/078966; dated Oct. 13, 2020 (6 pages).

* cited by examiner

FLANGE ELEMENT, A FLANGE CONNECTION COMPRISING SUCH FLANGE ELEMENTS AND A TOWER STRUCTURE

The present invention is related to a flange connection for a tower structure and a tower structure comprising such a flange connection.

Free standing tower structures, such as wind turbine towers, are often large and therefore built by securely connecting together two or more sections of the tower. The tower sections are usually built in lengths that are practical to handle, to transport to the building site and to lift at the building site. Wind turbine towers and similar tower structures are often built by flanging together conically shaped sections of the tower. The loads on the bolted joints that join the sections are of a dynamic nature due to the everyday wind induced loads and vibrations. In addition, extreme short term high loads can be experienced during storms. Since the most practical way of assembling the tower sections is by using bolted flange connections, a number of different designs have been developed, built and installed over the years, but still the industry is experiencing challenges with the existing bolted connections for such tower structures. In offshore installed wind turbine towers, and other similar load bearing structures, dynamic loads on the structure may come from wave and current induced dynamic response.

The most important challenges for bolted flange connection of large tower structures, such as wind turbine towers, are related to structural strength of the flange connection connecting the sections of the tower, fatigue resistance of the flange connection due dynamic response to the wind loads, and the loosening of the nuts of the bolts of the flange connection during operation due to vibration caused by wind flow passing the tower structure, including the large turbine blades.

The tower sections are commonly connected by providing the tower sections with flanges where two corresponding flanges on two adjacent sections are connected with a number of bolts. The loads on the bolts of the joint formed by connecting two adjacent sections of such a tower structure are of dynamic nature due to the constantly varying loads induced by winds and/or water. Consequently, there are several problems with bolted connections of this type. For example, fatigue in bolts since the bolt stresses are dynamic as a function of tower dynamic loads. There can also be problems due to additional bolt loads and local bending of bolts from prying effect on bolts since flanges starts separating partly or entirely under extreme tower loads. Furthermore, there is a problem with nut loosening caused by vibrations and dynamic loads. It is also a problem with water ingress to bolts causing corrosion of the bolts.

Various types of flange connections are known from a number of publications. In WO 93/17268 A1 there is disclosed a pipe joint for pipes carrying fluids under high pressure and/or for pipes being subject to large mechanical forces. The pipe joint is a flange connection where the flange rings and the bolts are arranged on the outside of the pipe.

Other publications that are relevant for large tower structures, such a wind towers and offshore load bearing structure, include UD 6470645 B1 where a flange face angle is disclosed in order to compensate for warping during welding. The two matching flanges are therefore parallel, also before pre-bolt loading.

Other publications include US 2004/112002 A1, EP 1318300 A1, US 2006/000185 A1, WO 2007/059768, US 2010126079 A1, US 2010/307097 A1, US 2011/135492 A1, US 2011/131898 A1.

Further publications include NO 321675 B1, EP 3219876, U.S. Pat. No. 6,470,645 B1, EP 2116675 B1, US 2010/0117353 A1, NO 177160 C.

There is also a paper on wind tower flanges: Design of bolted L-flanged connections, by N. L. Pedersen of the Technical University of Denmark. However, also in this publication only flat face flanges are described.

Hence, an objective of the present invention has been to mitigate at least one or some of the problems with prior art solutions.

A further objective of the present invention has been to provide a new flange connection for large tower structures that is capable of handling dynamic loads due to wind and/or water passing by the tower structure.

A further objective of the present invention has been to reduce problems with corrosion of bolts that connects the tower sections of a tower structure.

These objectives are achieved with a flange element as defined in claim 1, a flange connection as defined in claim 10 and a tower structure as defined in claim 22. Further embodiments of the flange element, the flange connection and the tower structure are defined in the dependent claims.

Hence, there is provided a flange element for a flange connection with a longitudinal centre axis A where the flange element comprises a flange part having a front side with a front surface. The flange part is provided with a flange wedge that comprises a flange wedge surface that is part of the front surface, and a flange heel that comprises a flange heel surface that is part of the front surface. The flange wedge surface makes a wedge surface angle $\alpha_1$ and the flange heel surface makes a heel surface angle $\beta$ with a plane P that is perpendicular to the longitudinal centre axis A of the flange element.

In a flange connection, front surface of the flange element is the part of the flange element that faces another element, usually another flange element of the same type, to which the flange element is connected, typically with bolts. Therefore, the front surface is preferably adapted to face and be attached to a second flange element of the flange connection. The front surface may also be adapted to face and be attached to another attachment element, for example to a basement, floor or other types of elements.

The present flange element comprises a flange wedge with a flange wedge and a flange heel with a flange heel surface. The flange wedge surface and the flange heel surface will normally together make up the surface that is in contact with the element, typically another flange element, to which the flange element is securely connected.

The wedge surface angle $\alpha_1$ and the heel surface angle $\beta$ may be different. Alternatively, the wedge surface $\alpha_1$ and the heel surface angle $\beta$ are substantially equal in size.

Preferably, a rear surface of a rear side of the flange part makes a rear surface angle $\alpha_2$ with the plane P that is perpendicular to the longitudinal centre axis A of the ring-shaped flange element. Preferably, the wedge surface $\alpha_1$ and the rear surface angle $\alpha_2$ are equal but may obviously be different if that is desired. Typically, the wedge surface angle, the heel surface angle and the rear surface angle are in the range 0.1° to 3°.

The flange element is preferably ring-shaped, i.e. the flange element is provided with a substantially circular shape as seen in a cross section that is perpendicular to the plane P that is perpendicular to the centre axis A of the flange element.

Preferably, the flange element is provided with a flange recess that extends around the circumference of the flange element and separates the flange wedge and the flange heel. In other words, the flange wedge and the flange heel are protruding from the flange part relative to the flange recess.

The flange element is preferably provided with a plurality of bolt holes that passes through the flange part of the flange element. The bolt holes have respective bolt hole openings that preferably lead into the flange recess. The bolt holes therefore extend from the flange recess in one end through the flange part to the rear side of the flange part in the other end.

Preferably, the flange wedge and the flange heel both extend around the entire circumference of the flange element. Alternatively, one or both of the flange wedge and the flange heel are designed to be staggered around the circumference of the flange element.

The flange element preferably further comprises an attachment part that is adapted for secure attachment to a tubular element. The tubular element is typically a tower section of the tower structure for a wind turbine, a water tank or other devices that are mounted on a tower structure. The tubular element can obviously also be part of a subsea structures. The tubular element could also be a pipe element that is part of an offshore load bearing structure or an underwater tunnel built as a large conduit.

The flange element preferably comprises a transition region on a radial inside of the flange element, between an attachment part and the flange part, i.e. in the region where the attachment part meets the flange part, where the transition region preferably is provided with a curved shape, for example an elliptical shape, a circular shape or any other curved shape that will allow a sufficiently low stress concentration to be obtained.

Preferably, the attachment part comprises at least one weld bevel, but preferably two weld bevels, that extend partly or, preferably, around the entire circumference of the flange element. The attachment part can thereby be welded to a tubular element as mentioned above.

Preferably, the flange part is arranged radially on the inside of the flange element, i.e. the flange part faces the radial inside of the flange element.

There is also provided a flange connection having a longitudinal centre axis A where the flange connection comprises a first flange element that has a first front side with a first front surface and a second flange element that has a second front side with a second front surface. The first flange element comprises a first flange part that is provided with a first flange wedge comprising a first flange wedge surface that is part of the first front surface, and a first flange heel comprising a first flange heel surface that is part of the first front surface. The first flange wedge surface makes a first wedge surface angle $\alpha_{11}$ and the first flange heel surface makes a first heel surface angle $\beta_1$ with a plane P that is perpendicular to the longitudinal centre axis A of the flange connection. The second flange element comprises a second flange part that is provided with a second flange wedge comprising a second flange wedge surface that is part of the second front surface, and a second flange heel comprising a second flange heel surface that is part of the second front surface. The second flange wedge surface makes a second wedge surface angle $\alpha_{12}$ and the second flange heel surface makes a second heel surface angle $\beta_2$ with a plane P that is perpendicular to the longitudinal centre axis A of the flange connection. Further, the first flange element and the second flange element are adapted to be securely and disconnectably connected to each other.

With this design of the flange and the flange connection, the principal feature of the present flange and flange connection, which is the static behavior of the flange and bolting for dynamic loads, i.e. the response of the flange and bolting to dynamic loads. Static behavior means small stress amplitudes for large load amplitudes, i.e. large variations of the load amplitudes on the structure that the flange connection is part of, for example wind loads on a tower structure of a wind turbine, leads to small stress amplitudes in the flange elements of the flange connection.

The first wedge surface angle $\alpha_{11}$ and the second wedge surface angle $\alpha_{12}$ are preferably equal. Alternatively, the first wedge surface angle $\alpha_{11}$ and the second wedge surface angle $\alpha_{12}$ are different.

The first heel surface angle $\beta_1$ and the second heel surface angle $\beta_2$ are preferably equal. Alternatively, the first heel surface angle $\beta_1$ and the second heel surface angle $\beta_2$ are different.

A first rear surface of a first rear side of the first flange part makes a first rear surface angle $\alpha_{21}$ with the plane P that is perpendicular to the longitudinal centre axis A of the flange element and a second rear surface of a second rear side of the second flange part makes a second rear surface angle $\alpha_{22}$ with the plane P. Preferably the first wedge surface angle $\alpha_{11}$ and the first rear surface angle $\alpha_{21}$ are equal, and the second wedge surface angle $\alpha_{12}$ and the second rear surface angle $\alpha_{22}$ are equal. Typically, the first wedge surface angle, the second wedge surface angle, the first heel surface angle, the second heel surface angle, the first rear surface angle and the second rear surface angle are in the range 0.1° to 3°.

As mentioned, the present first flange element comprises a first flange wedge with a first flange wedge surface and a first flange heel with a first flange heel surface and the second flange element comprises a second flange wedge with a second flange wedge surface and a second flange heel with a second flange heel surface. The first flange wedge surface of the first flange wedge is preferably in contact with the second flange wedge surface of the second flange wedge when the first flange element and the second flange element are securely connected to each other. Similarly, the first flange heel surface of the first flange heel is preferably in contact with the second flange heel surface of the second flange heel when the first flange element and the second flange element are securely connected to each other.

In a flange connection, the first and second flange wedge surfaces and the first and second flange heel surfaces of the first and second flange parts will normally be the surfaces that are in contact with each other in a flange connection according to the present invention.

The first flange element and the second flange element are preferably substantially ring-shaped. That means that the first flange element and the second flange element both extend around the entire circumference, i.e. all 360 degrees, of the flange connection and preferably have a substantially circular shape in a cross-section perpendicular to the longitudinal axis A of the flange connection but may also in some cases be provided with a non-circular shape, for example a polygonal shape.

The first flange element is preferably provided with a first flange recess that extends around the circumference of the first flange element and separates the first flange wedge and the first flange heel. The second flange element is preferably also provided with a second flange recess that extends around the circumference of the second flange element and separates the second flange wedge and the second flange heel. When manufacturing the first and second flange elements, the first flange recess and the second flange recess can be made by removing material from the first front surface and second front surface of the first and second flange elements respectively, for example by cutting or milling out a groove in the first and second front surfaces, thereby forming the first and second flange recesses and also the first and second flange wedges and the first and second flange heels.

The flange element is preferably provided with a plurality of bolt holes that passes through the flange part of the flange element. The bolt holes have respective bolt hole openings that preferably lead into the flange recess. The bolt holes therefore extend from the flange recess in one end through the flange part to the rear side of the flange part in the other end.

The first flange element is preferably provided with a number of bolt holes where the bolt holes pass through the first flange part of the first flange element. The bolt holes have respective bolt hole openings that preferably lead into the first flange recess. The bolt holes therefore extend in one end from the bolt hole openings in the first flange recess and through the first flange part to the first rear side of the first flange part in the other end. The second flange element is preferably provided with the same number of bolt holes where the bolt holes pass through the second flange part of the second flange element. The bolt holes have respective bolt hole openings that preferably lead into the second flange recess. The bolt holes therefore extend in one end from the bolt hole openings in the second flange recess and through the second flange part to the second rear side of the second flange part in the other end. When the first flange element is connected to the second flange element to form the flange connection, bolts can thereby be passed through corresponding bolt holes in the first flange element and the second flange element and nuts can be screwed on the bolts to connect the first flange element and the second flange part securely to each other.

As indicated above, the first flange wedge of the first flange element and the first flange heel of the first flange element both preferably extend around the entire circumference of the first flange element. Similarly, the second flange wedge of the second flange element and the second flange heel of the second flange element preferably also extend around the entire circumference of the second flange element. When the first flange element and the second flange element are attached to each other to form the flange connection, the first flange wedge surface and the second flange wedge surface will substantially be in contact around the entire circumference of the flange connection. However, the first flange wedge and/or the first flange heel and/or the second flange wedge and/or the second flange heel may in some embodiments be formed in a staggered way, i.e. the first flange wedge surface is not in contact with the second flange wedge surface around the entire circumference of the flange connection and/or the first flange heel surface is not in contact with the second flange heel surface around the entire circumference of the flange connection.

The first flange element preferably comprises a first attachment part that is adapted for secure attachment to a tubular element, and the second flange element preferably comprises a second attachment part that is adapted for secure attachment to a tubular element.

The first attachment part may be securely attached to the tubular element in various ways. For example, the first attachment part may comprise at least one first weld bevel that extends partly or preferably completely around the circumference of the first flange element, and the second attachment part may comprise at least one second weld bevel that extends partly or completely around the circumference of the second flange element. The first flange element and the second flange element can thereby be securely attached to their respective tubular elements, such as a tower structure section, by welding the first attachment part and the second attachment part to the tubular elements.

The first flange element preferably comprises a first transition region on a radial inside of the first flange element, between a first attachment part and the first flange part, where the first transition region preferably is provided with curved shape, for example an elliptical shape, a circular shape or any other curved shape that will allow a sufficiently low stress concentration to be obtained. In the same way, the second flange element preferably comprises a second transition region on a radial inside of the second flange element, between a second attachment part and the second flange part where the second transition region preferably is provided with a curved shape, for example an elliptical shape, a circular shape or any other curved shape that will allow a sufficiently low stress concentration to be obtained. The first transition region and the second transition region preferably extend around the entire circumference of the first flange element and the second flange element respectively.

The flange element comprises a transition region on a radial inside of the flange element, between an attachment part and the flange part, i.e. in the region where the attachment part meets the flange part, where the transition region preferably is provided with a curved shape, for example an elliptical shape, a circular shape or any other curved shape that will allow a sufficiently low stress concentration to be obtained.

In order to facilitate the attachment of the first flange element to the second flange element, the first flange element and the second flange element are similarly shaped, and preferably substantially identically shaped, i.e. they have substantially identical designs.

There is also provided a tower structure having a longitudinal centre axis A where the tower structure comprises at least a first tower section and a second tower section, where the first tower section and the second tower section are securely connected to each other with a flange connection according to the present invention and described above.

The first flange part and the second flange part of the flange connection is preferably arranged radially on the inside of the tower structure.

The tower structure may comprise more than two tower sections where all adjacent tower sections are securely attached to each other with a flange connection according to the present invention and described above.

The flange elements according to the present invention and described above and/or one or more flange connection according to the present invention and described above is suitably used to connect adjacent tower sections of a tower structure.

The tower structure according to the present invention and described above is suitably used to support a wind turbine, a water tank or any other structure that can be supported by a tower structure.

Other features and advantages of the invention will appear from the following description of preferred, non-limiting embodiments of the invention, with reference to the figures where:

It should be noted that the same reference numbers are used to denote the same features in all the drawings.

Figure 1:
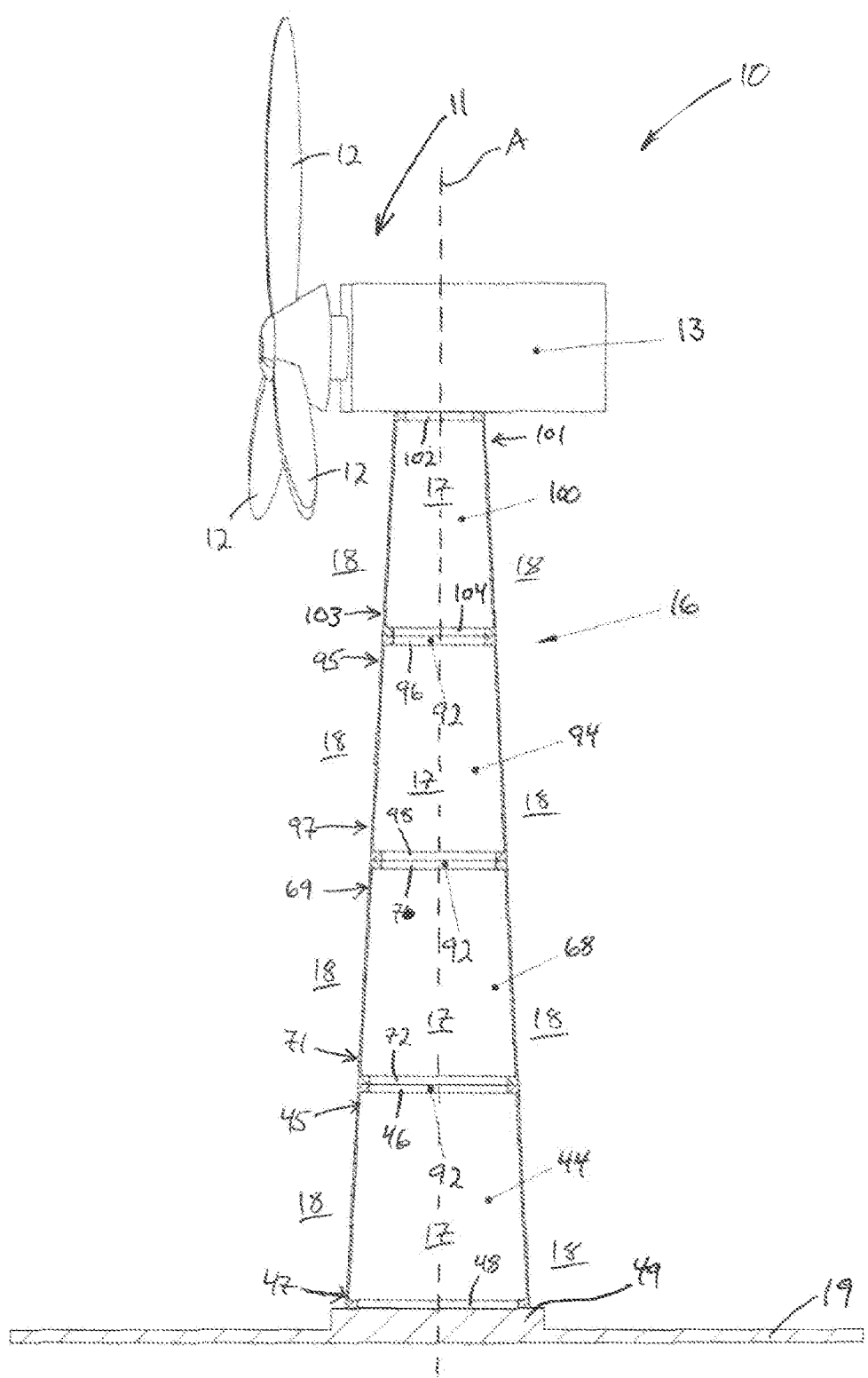
FIG. 1 shows a large tower structure according to the present invention for a wind turbine where the flange connections that connects two adjacent sections of the tower structure is indicated.
Figure 2:
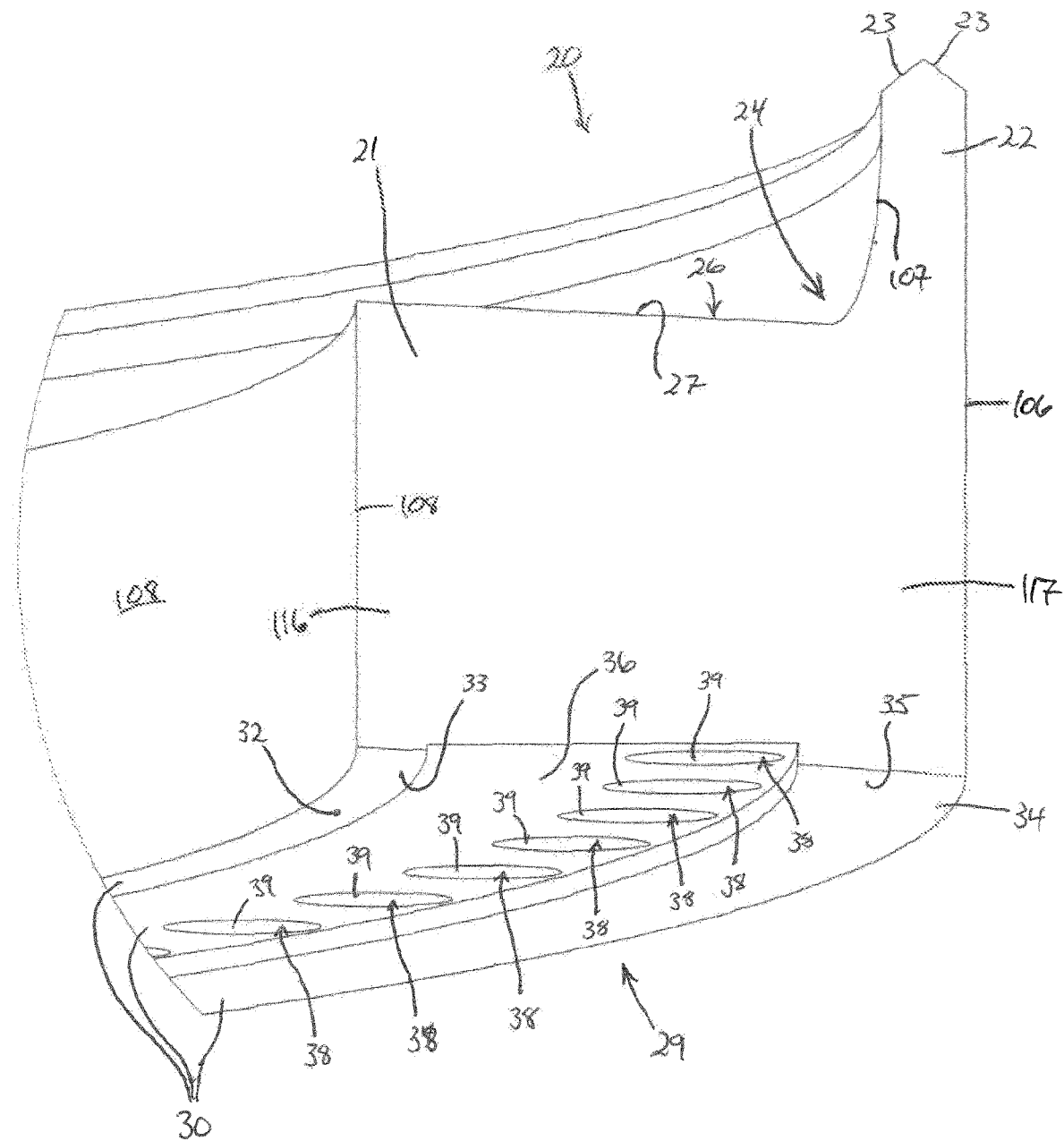
FIG. 2 shows a perspective view of a part of a tower section including a flange of a flange connection according to the present invention.
Figure 3:
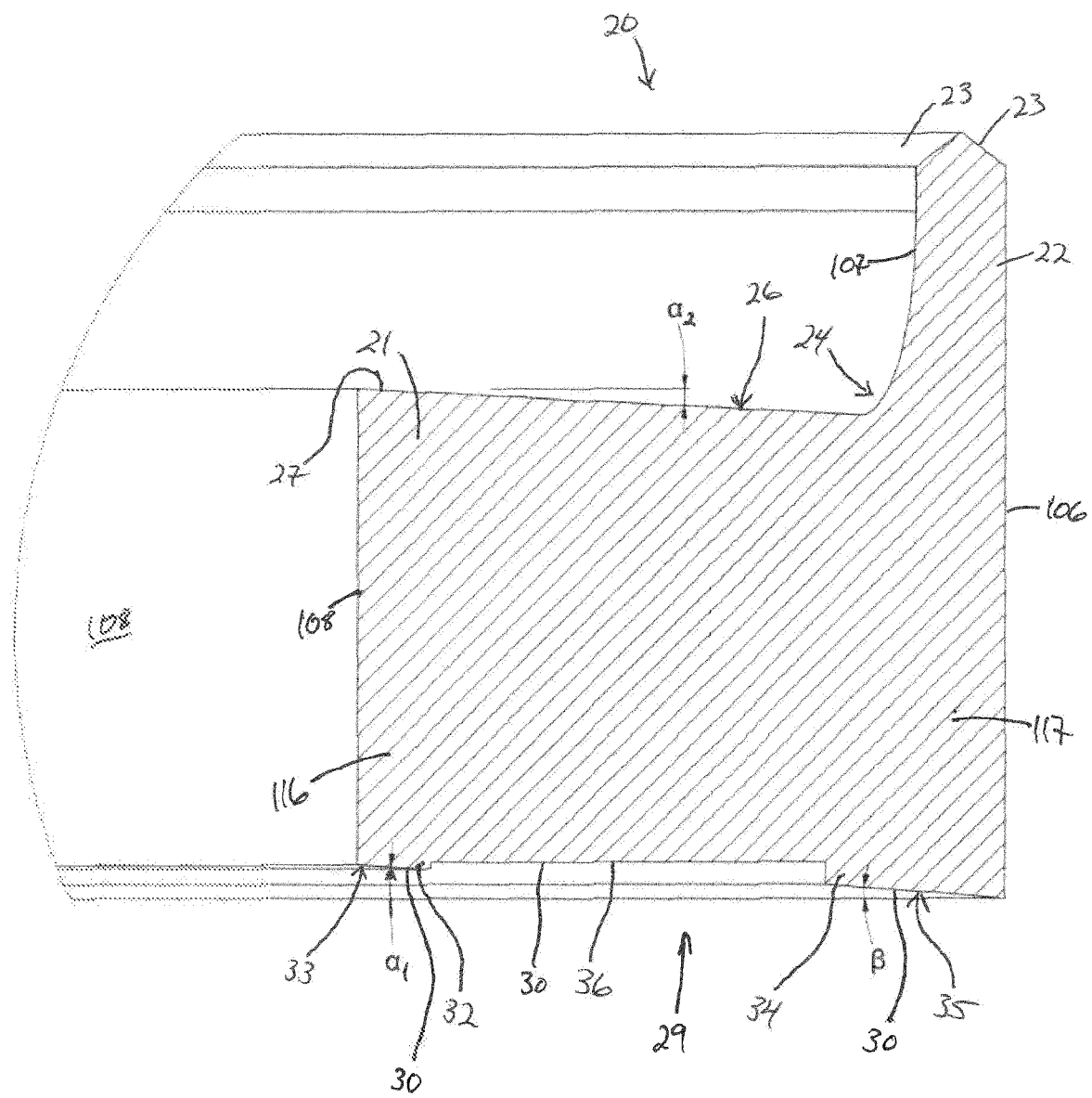
FIG. 3 shows a longitudinal section through a part of a tower section including a flange of a flange connection according to the present invention.
Figure 7:
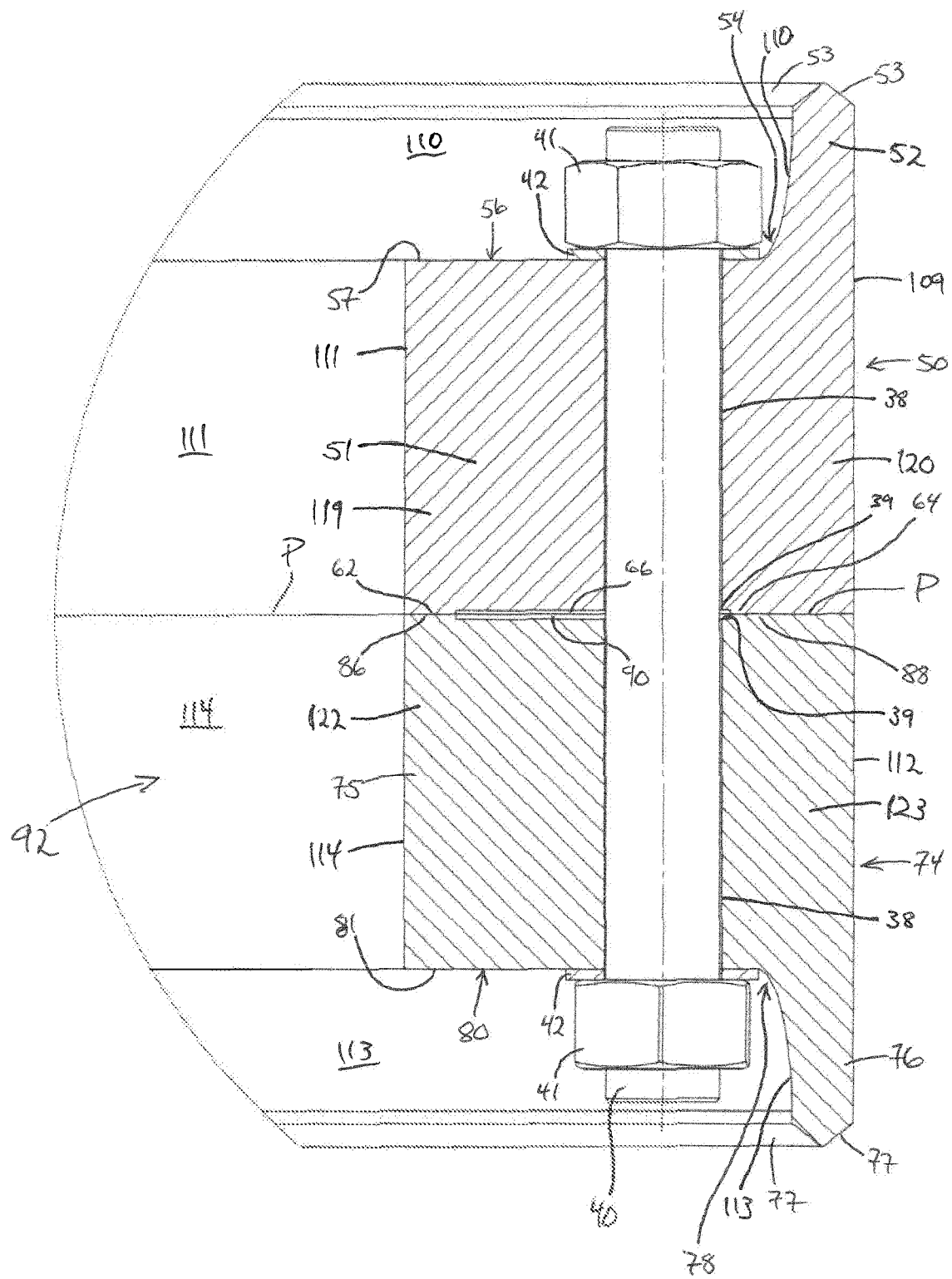
FIG. 7 shows a longitudinal section through a part of the tower structure including a flange connection according to the present invention after tightening of the bolts of the flange connection.
Figure 8:
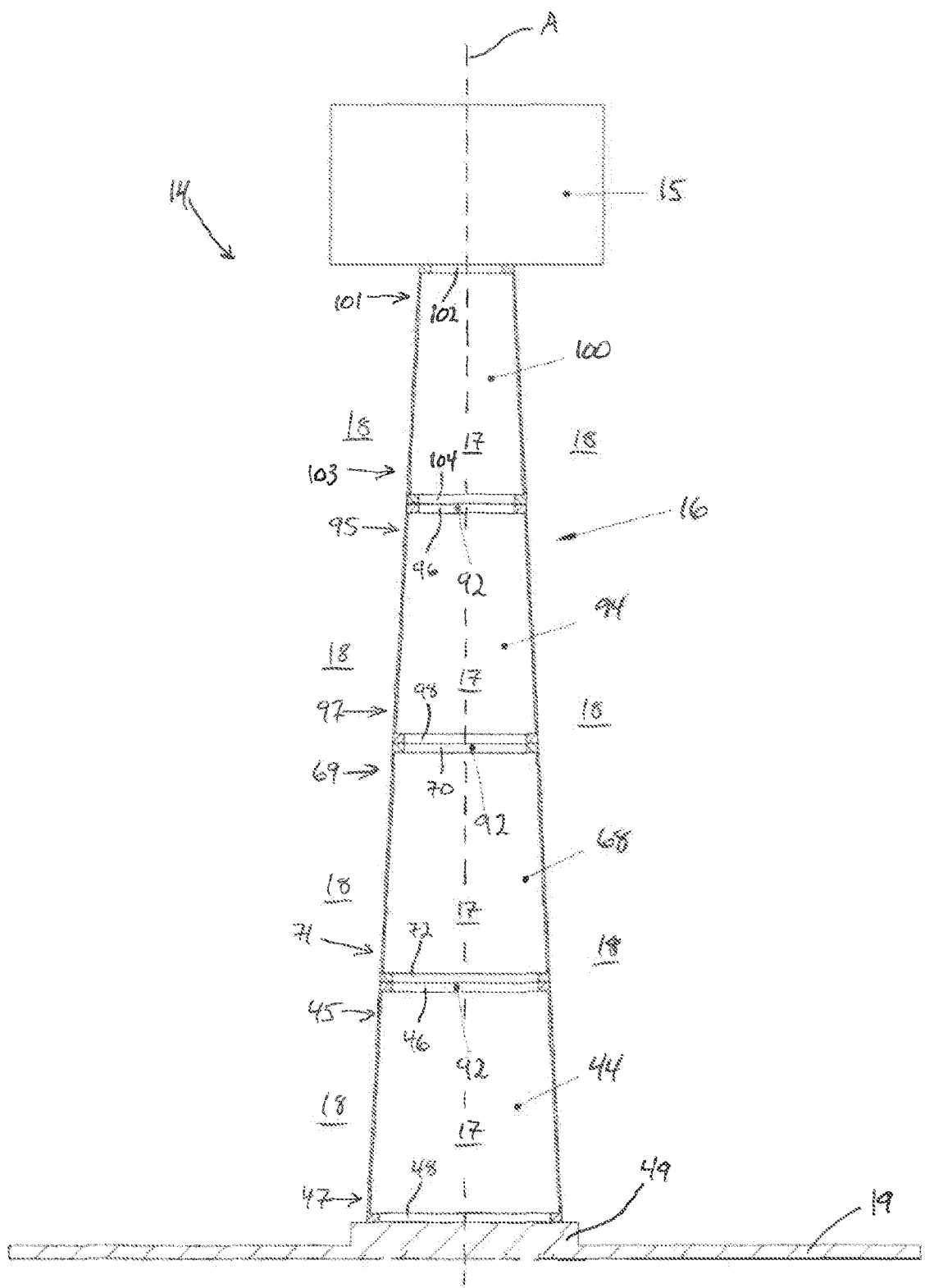
FIG. 8 shows a large tower structure according to the present invention for a large water tank where the flange connections that connects two adjacent sections of the tower structure is indicated.

FIGS. 2 and 3 shows a flange element 20 that can be used in a flange connection 92 as shown in more detail in FIGS. 4-7. The flange connection 92 is suitably used to connect tower sections 44, 68, 94, 100 to each other to form a tower structure 16 as shown in FIGS. 1 and 8. In FIG. 1 the tower structure 16 is shown to support a wind turbine 11 while in FIG. 8 the tower structure 16 is shown to support a water tank 15. The tower structure 16 can of course also be used to support other structures or devices.

In FIGS. 2-3 a flange element 20 is shown. The flange element 20 comprises a flange part 21 and an attachment part 22. The flange part 21 comprises an inner portion 116 and a flange part inner side 108 that faces the centre or radial inside of the flange part 21. The flange part 21 further comprises a radially outer portion 117 as indicated in the figures. In the longitudinal direction A of the flange element 20 the flange part is provided with a rear side 26 with a rear surface 27 and a front side 29 with a front surface 30. The front side 29 is located on the opposite side of the flange part 21 as compared to the rear side 26, i.e. the front side 29 and the rear side 26 are located on axially opposite sides of the flange part 21. The attachment part 22 is nearly perpendicular to the flange part 21 but depending on the geometry of the tubular element to which the flange element 20 is attached, the angle between the attachment part 22 and the flange part 21 can be slightly different from 90°. For example, a tower structure 16 for a wind turbine 11 will usually have a slightly conical shape and the angle between the attachment part 22 and the flange part 21 will be substantially equal to the angle that the conical tower makes with a horizontal plane. The flange element 20 is normally made in a single piece, for example by forging, ring rolling or casting before machining of faces and drilling of bolt holes, and the radially outer side of the attachment part 22 and the radially outer side of the flange part 21 together form the radially outer side 106 of the flange element 20. The attachment part 21 is further provided with an attachment part inner side 107 that faces the centre or the radial inside of the flange element 20.

The attachment part 22 is designed to be attached to a tubular element, for example a tower section 44, 68, 94, 100 as shown in FIGS. 1 and 8, or to a large-diameter pipe element or any other types of tubular elements that are to be interconnected. To facilitate the attachment of the attachment part 22 to the tubular element, the attachment part 22 is preferably provided with at least one, but preferably two weld bevels 23 as shown in FIGS. 2 and 3. The weld bevels 23 preferably extend around the entire circumference of the first flange element 20. The flange element 20 can thereby be securely attached to the tubular element by welding the attachment part 22 to the tubular element.

As mentioned, the flange part 21 is normally arranged at a substantially right angle with the attachment part 22 as indicated in FIGS. 2-3. In a region between the flange part 21 and the attachment part 22 there is a transition region 24 that partially overlaps with the attachment part inner side 107 of the attachment part 22 and the rear side 26 of the flange part 21. If the attachment part inner side 107 of the attachment part 22 and the rear side 26 of the flange part 21 meet at a substantially right angle, large stresses may arise due to external loads and consequently damage to the flange element 20 may occur. The transition region 24 is therefore preferably provided with a curved shape. Preferably the transition region 24 is provided with an elliptical shape as indicated in the drawings where the transition region extends a longer distance along the attachment part inner side 107 of the attachment part 22 than along the rear side 26 of the flange part 21. The transition region 24 could also be provided with other types of curved shapes, such as a substantially circular shape. With the curvedly shaped transition region 24, and in particular an elliptically shaped transition region 24, a noticeably lower stress concentration factor is obtained.

The flange element 20 is preferably ring-shaped, i.e. the flange element has a substantially circular shape in cross-section in a plane that is perpendicular to a longitudinal axis A passing through the centre of the flange element 20 as indicated in FIGS. 1 and 8 where the tower structures 16 that are shown are provided with tower sections 44, 68, 94, 100 that are connected to each other with flange connections 92 comprising two flange elements 20 attached to respective adjacent tower sections 44, 68, 94, 100. Although the flange element 20 preferably has a circular shape, the flange element 20 may of course be provided with a non-circular shape, for example a polygonal shape. Non-circular shapes of the flange element 20 is most likely to be of interest if the tower sections have a non-circular cross-sectional shape, for example a polygonal shape where the flange element 20 may be provided with a corresponding polygonal shape.

The inner portion 116 of the flange part 21 is provided with a flange wedge 32 that projects out on the front side 29 of the flange part 21. The flange wedge 32 is provided with a flange wedge surface 33 that is part of the front surface 30 of the flange part 21. The flange wedge surface 33 preferably makes a wedge surface angle $\alpha_1$ relative to a plane P that is perpendicular to the longitudinal axis A as explained above and shown in FIGS. 1 and 8. The wedge surface angle $\alpha_1$ is larger than 0 degrees and lie at least in the range 0.1° to 2°. Preferably, the wedge surface angle $\alpha_1$ lie in the range 0.5° to 1.5°.

The outer portion 117 of the flange part 21 is provided with a flange heel 34 that projects out on the front side 29 of the flange part 21. The flange heel 34 is provided with a flange heel surface 35 that is also part of the front surface 30 of the flange part 21. The flange heel surface 35 preferably makes a heel surface angle β relative to the plane P that is perpendicular to the longitudinal axis A as explained above and shown in FIGS. 1 and 8. The heel surface angle β is larger than 0 degrees and lie at least in the range 0.2° to 3° degrees. Preferably, the heel surface angle β lie in the range 0.5° to 2° degrees.

The wedge surface angle controls the flange rotation during the pre-loading of the bolts and has several advantages. The wedge surface angle makes the flange part 21 warp like a disc spring during assembly of the flange connection 92 and thereby the flange part 21 is pre-stressed, dominated by hoop stresses. The warping pre-stress of the flange part 21 ensures that the flange part 21 does not loose contact outside the flange recess 36 where the bolting is located, for any given tower design loads, which prevents water from penetrating into the annular opening formed by the flange recess 36 and causing corrosion of the bolts 40 arranged in bolt holes 38. Furthermore, the internal pre-stress of the flange part 21 causes separating forces on the nuts 41 that are screwed onto the bolts 40 in a flange connection 92, whereby the nuts 41 will not self-loosen due to vibrations or other dynamic loads. The bolt prestresses are static which provides superior fatigue properties. The static bolt stresses allow for higher bolt pre-stress and higher design load resistance of the flange element 20. Furthermore, there will be no prying effects on the bolts 40 before flange separation occurs, which will happen when the loads exceed the design loads of the flange connection 92.

The heel flange angle β creates a local high contact stress distribution which provides a water tight seal to prevent water from the surrounding from penetrating past the flange heel surface 35 into the flange connection and thereby protecting bolts from getting corroded.

Between the flange wedge 32 and the flange heel 34 of the flange part 21 there is preferably, but not necessarily, provided a flange recess 36. The flange recess 36 preferably extends around the entire circumference of the flange part 21.

The flange recess 36 is part of the front side 29 of the flange part 21 and the surface of the flange recess 36, the flange wedge surface 33 and the flange heel surface 35 make up substantially the whole front surface 30 of the flange part 21 of the flange element 20.

The flange part 21 is further provided with a number of bolt holes 38 that are preferably equally distributed around the circumference of the flange part 21. The bolt holes extend from the rear side 26 of the flange part 21, through the flange part 21 and ends in the front side 29 of the flange part 21. Preferably, but not necessarily, the bolt hole openings 39 of the bolt holes 40 are located in the flange recess 36.

The rear surface 27 of the rear side 26 of the flange part 21 preferably makes a rear surface angle $\alpha_2$ relative to the plane P that is perpendicular to the longitudinal axis A as explained above and shown in FIGS. 1 and 8. The rear surface angle $\alpha_2$ is preferably, but not necessarily, of substantially the same size as the wedge surface angle $\alpha_1$, i.e. the rear surface 27 and the flange wedge surface 33 are preferably parallel.

In FIGS. 4-7 there is shown a flange connection 92 comprising a first flange element 50 and a second flange element 74 where both the first flange element 50 and the second flange element 74 have the same design as the flange element 20 that is described above and shown in FIGS. 2-3.

The first flange element 50 comprises a first flange part 51 and a first attachment part 52. The first flange part 51 comprises a first inner portion 119 and a first flange part inner side 111 that faces the centre or radial inside of the first flange part 51. The first flange part 51 further comprises a radially first outer portion 120 as indicated in the figures. In the longitudinal direction A of the first and second flange elements 50, 74 the first flange part 51 is provided with a first rear side 56 with a first rear surface 57 and a first front side 59 with a first front surface 60. The first front side 59 is located on the opposite side of the first flange part 51 as compared to the first rear side 56. The first attachment part 52 extends upwards from the first flange part 51 as indicated in the figures, and is, depending on the geometry of the tubular element to which first flange element 50 is attached as indicated above, preferably arranged substantially perpendicular or close to perpendicular to the first flange part 51. The first flange element 50 is normally made in a single piece, for example by forging, ring rolling or casting before machining of faces and drilling of bolt holes, and the radially outer side of the first attachment part 52 and the radially outer side of the first flange part 51 together form the radially first outer side 109 of the first flange element 50. The first attachment part 52 is further provided with a first attachment part inner side 110 that faces the centre or the radial inside of the first flange element 50.

Figure 4:
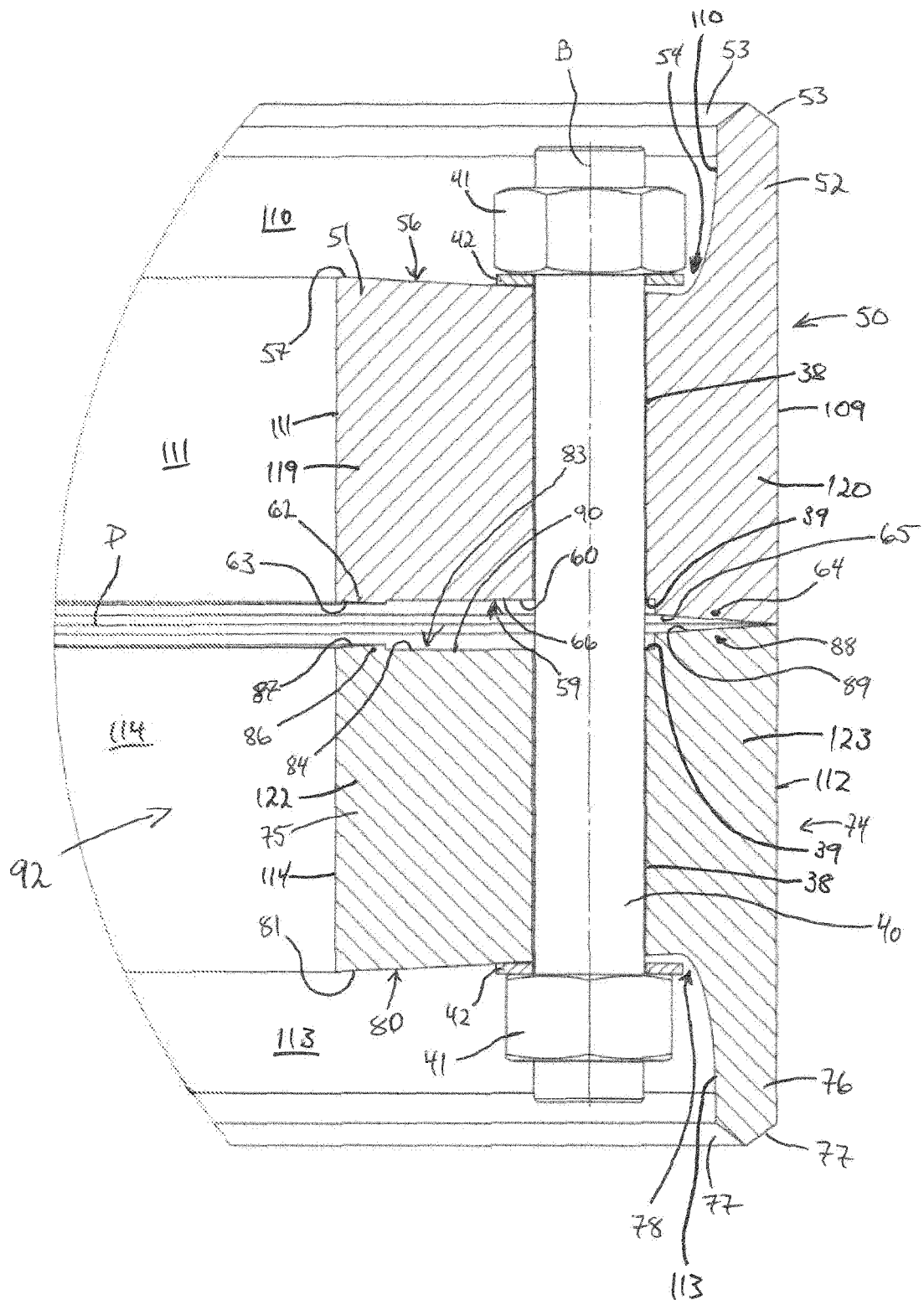
FIG. 4 shows a longitudinal section through a part of the tower structure including a flange connection according to the present invention before tightening of the bolts of the flange connection.

The first attachment part 52 is designed to be attached to a tubular element, for example to a tower section 44, 68, 94, 100 as shown in FIGS. 1 and 8, or to a large-diameter pipe element or any other types of tubular elements that are to be interconnected. To facilitate the attachment of the first attachment part 52 to the tubular element, the first attachment part 52 is preferably provided with at least one, but preferably two first weld bevels 53 as shown in FIGS. 4 and 7. The first weld bevels 53 preferably extend around the entire circumference of the first flange element 50. The first flange element 50 can thereby be securely attached to the tubular element by welding the first attachment part 52 to the tubular element.

As mentioned, the first flange part 51 is preferably arranged at a substantially right angle with the first attachment part 52 as indicated in FIGS. 4-7. In a region between the first flange part 51 and the first attachment part 52 there is a transition region 54 that partially overlaps with the first attachment part inner side 110 of the first attachment part 52 and the first rear side 56 of the first flange part 51. If the first attachment part inner side 110 of the first attachment part 52 and the first rear side 56 of the first flange part 51 meet at a substantially right angle, large stresses may arise due to external loads and consequently damage to the first flange element 50 may occur. The first transition region 54 is therefore preferably provided with a curved shape. Preferably the first transition region 54 is provided with an elliptical shape as indicated in the figures where the first transition region 54 extends a longer distance along the first attachment part inner side 110 of the first attachment part 52 than along the first rear side 56 of the first flange part 50. The first transition region 54 could also be provided with other types of curved shapes, such as a substantially circular shape. With the curvedly shaped first transition region 54, and in particular an elliptically shaped first transition region 54, a noticeably lower stress concentration factor is obtained.

The first flange element 50 is preferably ring-shaped, i.e. the first flange element 50 is provided with a substantially circular shape in cross-section in a plane P that is perpendicular to a longitudinal axis A passing through the centre of the flange connections 92 as indicated in FIGS. 1 and 8 where the tower structures 16 that are shown are provided with tower sections 44, 68, 94, 100 that are connected to each other with flange connections 92 comprising the first flange element 50 and the second flange element 74 that are attached to respective adjacent tower sections 44, 68, 94, 100. Although the first flange element 50 preferably has a circular shape, the first flange element 50 may of course be provided with a non-circular shape, for example a polygonal shape. Non-circular shapes of the first flange element 50 is most likely to be of interest if the tower sections have a non-circular cross-sectional shape, for example a polygonal shape, where the first flange element 50 may be provided with a corresponding polygonal shape.

The first inner portion 119 of the first flange part 51 is provided with a first flange wedge 62 that projects out on the first front side 59 of the first flange part 51. The first flange wedge 62 is provided with a first flange wedge surface 63 that is part of the first front surface 60 of the first flange part 51. The first flange wedge surface 63 preferably makes a first wedge surface angle $\alpha_{11}$ relative to the plane P that is perpendicular to the longitudinal axis A as explained above and shown in FIGS. 1 and 8. The first wedge surface angle $\alpha_{11}$ is larger than 0 degrees and lie at least in the range 0.1° to 2°. Preferably, the first wedge surface angle $\alpha_{11}$ lie in the range 0.5° to 1.5°.

The first outer portion 120 of the first flange part 51 is provided with a first flange heel 64 that projects out on the first front side 59 of the first flange part 51. The first flange heel 64 is provided with a first flange heel surface 65 that is also part of the first front surface 60 of the first flange part 51. The first flange heel surface 65 preferably makes a first heel surface angle $\beta_1$ relative to the plane P that is perpendicular to the longitudinal axis A as explained above and shown in FIGS. 1 and 8. The first heel surface angle $\beta_1$ is larger than 0 degrees and lie at least in the range 0.2° to 3°. Preferably, the first heel surface angle $\beta_1$ lie in the range 0.5° to 2°.

Between the first flange wedge 62 and the first flange heel 64 of the first flange part 51 there is preferably, but not necessarily, provided a first flange recess 66. The first flange recess 66 preferably extends around the entire circumference of the first flange part 51.

The first flange recess 66 is part of the first front side 59 of the first flange part 51 and the surface of the first flange recess 66, the first flange wedge surface 63 and the first flange heel surface 65 make up substantially the whole first front surface 60 of the first flange part 51 of the first flange element 50.

The first flange part 51 is further provided with a number of bolt holes 38 that are preferably equally distributed around the circumference of the first flange part 51. The bolt holes extend from the first rear side 56 of the first flange part 51, through the first flange part 51 and ends in the first front side 59 of the first flange part 51. Preferably, but not necessarily, the bolt hole openings 39 of the bolt holes 38 are located in the first flange recess 66.

The first rear surface 57 of the first rear side 56 of the first flange part 51 preferably makes a first rear surface angle $\alpha_{21}$ relative to the plane P that is perpendicular to the longitudinal axis A as explained above and shown in FIGS. 1 and 8. The first rear surface angle $\alpha_{21}$ is preferably, but not necessarily, of substantially the same size as the first wedge surface angle $\alpha_{11}$.

The second flange element 74 of the flange connection 92 shown in FIGS. 4-7 comprises a second flange part 75 and a second attachment part 76. The second flange part 75 comprises a second inner portion 122 and a second flange part inner side 114 that faces the centre or radial inside of the second flange part 75. The second flange part 75 further comprises a radially second outer portion 123 as indicated in the figures. In the longitudinal direction A of the first and second flange elements 50, 74 the second flange part 75 is provided with a second rear side 80 with a second rear surface 81 and a second front side 83 with a second front surface 84. The second front side 83 is located on the opposite side of the second flange part 75 as compared to the second rear side 80. The second attachment part 76 extends downwards from the second flange part 75 as indicated in the figures, i.e. in the opposite direction of the first attachment part 52 in a bolted flange connection 92, and is, depending on the geometry of the tubular element to which second flange element 74 is attached as indicated above, preferably arranged substantially perpendicular or close to perpendicular to the second flange part 75. The second flange element 74 is normally made in a single piece, for example by forging, ring rolling or casting before machining of faces and drilling of bolt holes, and the radially outer side of the second attachment part 76 and the radially outer side of the second flange part 75 together form the radially second outer side 112 of the second flange element 74. The second attachment part 76 is further provided with a second attachment part inner side 113 that faces the centre or the radial inside of the second flange element 74.

The second attachment part 76 is designed to be attached to a tubular element, for example to a tower section 44, 68, 94, 100 as shown in FIGS. 1 and 8, or to a large-diameter pipe element or any other types of tubular elements that are to be interconnected. To facilitate the attachment of the second attachment part 76 to the tubular element, the second attachment part 76 is preferably provided with at least one, but preferably two second weld bevels 77 as shown in FIGS. 4 and 7. The second weld bevels 77 preferably extend around the entire circumference of the second flange element 74. The second flange element 74 can thereby be securely attached to the tubular element by welding the second attachment part 76 to the tubular element.

As mentioned, the second flange part 75 is preferably arranged at a substantially right angle with the second attachment part 76 as indicated in FIGS. 4-7. In a region between the second flange part 75 and the second attachment part 76 there is a second transition region 78 that partially overlaps with the second attachment part inner side 113 of the second attachment part 76 and the second rear side 80 of the second flange part 75. If the second attachment part inner side 113 of the second attachment part 76 and the second rear side 80 of the second flange part 75 meet at a substantially right angle, large stresses may arise due to external loads and consequently damage to the second flange element 74 may occur. The second transition region 78 is therefore preferably provided with a curved shape. Preferably the second transition region 78 is provided with an elliptical shape as indicated in the figures where the second transition region 78 extends a longer distance along the second attachment part inner side 113 of the second attachment part 76 than along the second rear side 80 of the second flange part 75. The second transition region 78 could also be provided with other types of curved shapes, such as a substantially circular shape. With the curvedly shaped second transition region 78, and in particular an elliptically shaped second transition region 78, a noticeably lower stress concentration factor is obtained.

The second flange element 74 is preferably ring-shaped, i.e. the second flange element 74 is provided with a substantially circular shape in cross-section taken in a plane P that is perpendicular to a longitudinal axis A passing through the centre of the flange connections 92 as indicated in FIGS. 1 and 8 where the tower structures 16 that are shown are provided with tower sections 44, 68, 94, 100 that are connected to each other with flange connections 92 comprising the first flange element 50 and the second flange element 74 that are attached to respective adjacent tower sections 44, 68, 94, 100. Although the second flange element 74 preferably is provided with a circular shape, the second flange element 74 may of course be provided with a non-circular shape, for example a polygonal shape. Non-circular shapes of the second flange element 74 is most likely to be of interest if the tower sections have a non-circular cross-sectional shape, for example a polygonal shape, where the second flange element 74 may be provided with a corresponding polygonal shape.

The second inner portion 122 of the second flange part 75 is provided with a second flange wedge 86 that projects out on the second front side 83 of the second flange part 75. The second flange wedge 86 is provided with a second flange wedge surface 87 that is part of the second front surface 84 of the second flange part 75. The second flange wedge surface 87 preferably makes a second wedge surface angle $\alpha_{12}$ relative to the plane P that is perpendicular to the longitudinal axis A as explained above and shown in FIGS. 1 and 8. The second wedge surface angle $\alpha_{12}$ is larger than 0 degrees and lie at least in the range 0.1° to 2°. Preferably, the second heel surface angle $\beta_2$ lie in the range 0.5° to 1.5°.

The second outer portion 123 of the second flange part 75 is provided with a second flange heel 88 that projects out on the second front side 83 of the second flange part 75. The second flange heel 88 is provided with a second flange heel surface 89 that is also part of the second front surface 84 of the second flange part 75. The second flange heel surface 89 preferably makes a second heel surface angle $\beta_2$ relative to the plane P that is perpendicular to the longitudinal axis A as explained above and shown in FIGS. 1 and 8. The second heel surface angle $\beta_2$ is larger than 0 degrees and lie at least in the range 0.2° to 3°. Preferably, the second heel surface angle $\beta_2$ lie in the range 0.5° to 2°.

Between the second flange wedge 86 and the second flange heel 88 of the second flange part 75 there is preferably, but not necessarily, provided a second flange recess 90. The second flange recess 90 preferably extends around the entire circumference of the second flange part 75.

The second flange recess 90 is part of the second front side 83 of the second flange part 75 and the surface of the second flange recess 90, the second flange wedge surface 87 and the second flange heel surface 89 make up substantially the whole second front surface 84 of the second flange part 75 of the second flange element 74.

The second flange part 75 is further provided with a number of bolt holes 38 that are distributed around the circumference of the second flange part 75. The bolt holes extend from the second rear side 80 of the second flange part 75, through the second flange part 75 and ends in the second front side 83 of the second flange part 75. Preferably, but not necessarily, the bolt hole openings 39 of the bolt holes 38 are located in the second flange recess 90.

The second rear surface 81 of the second rear side 80 of the second flange part 75 preferably makes a second rear surface angle $\alpha_{22}$ relative to the plane P that is perpendicular to the longitudinal axis A as explained above and shown in FIGS. 1 and 8. The second rear surface angle $\alpha_{22}$ is preferably, but not necessarily, of substantially the same size as the second wedge surface angle $\alpha_{12}$.

Figure 5:
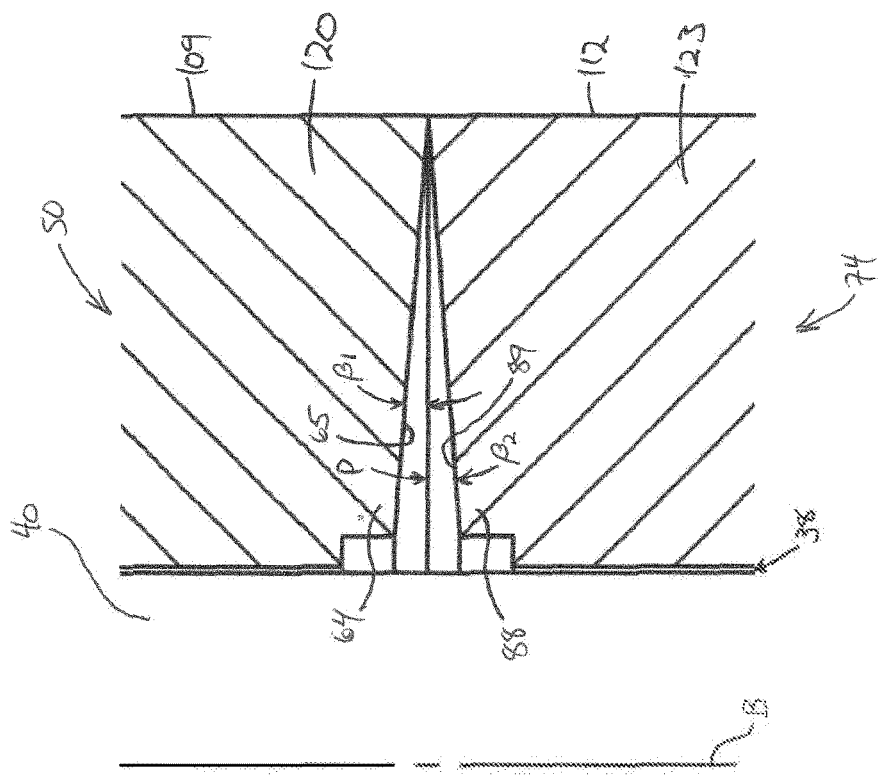
FIG. 5 shows an enlarged cutout of FIG. 4 showing the first and second wedge surface angles and the first and second heel surface angles in more detail.
Figure 5:
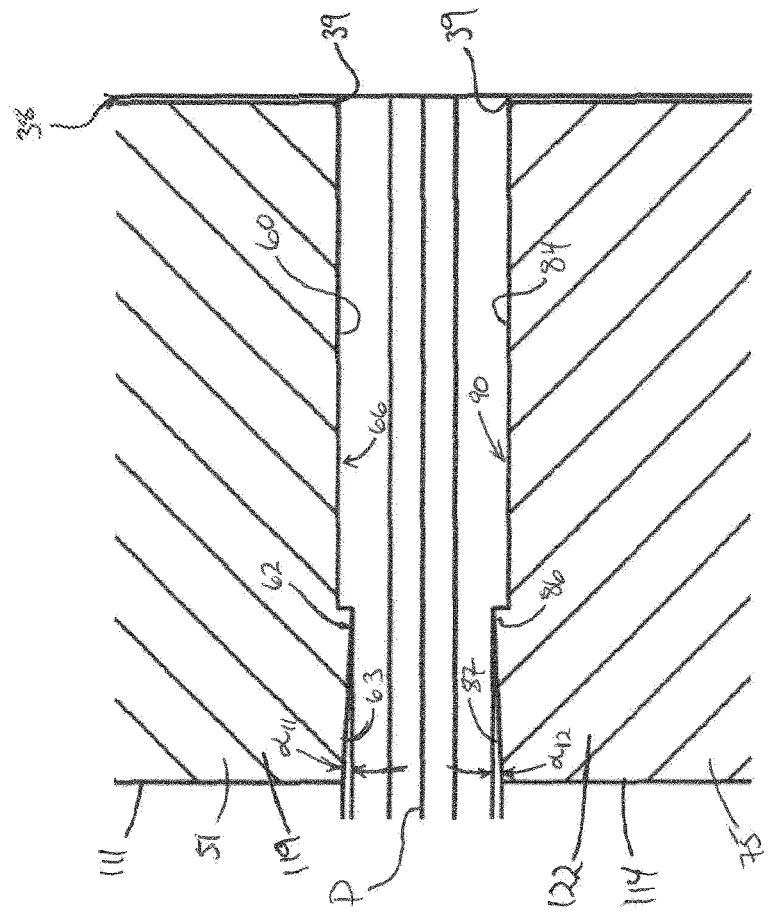
Figure 6A:
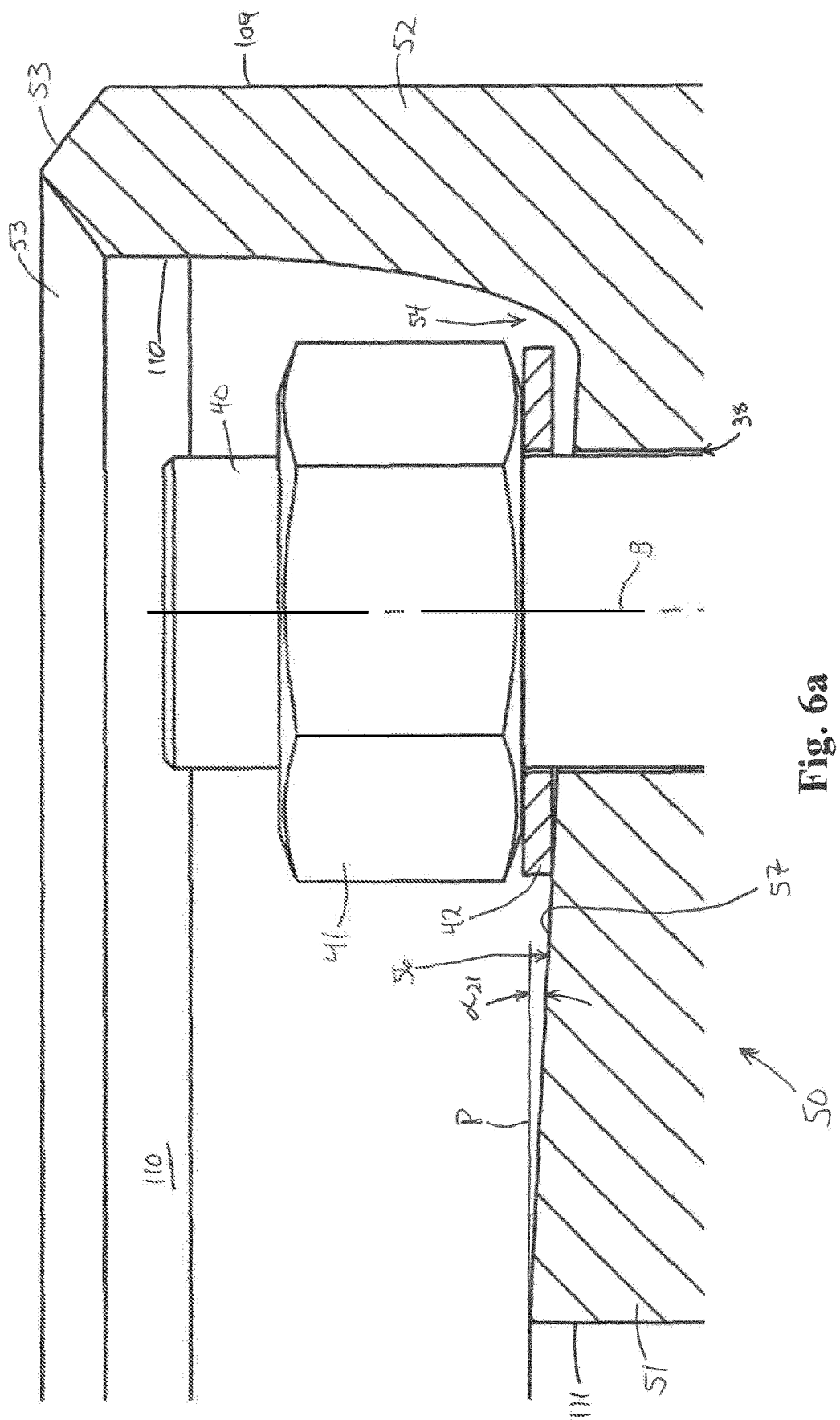
FIG. 6a shows an enlarged cutout of FIG. 4 showing the first rear surface angle in more detail.
Figure 6B:
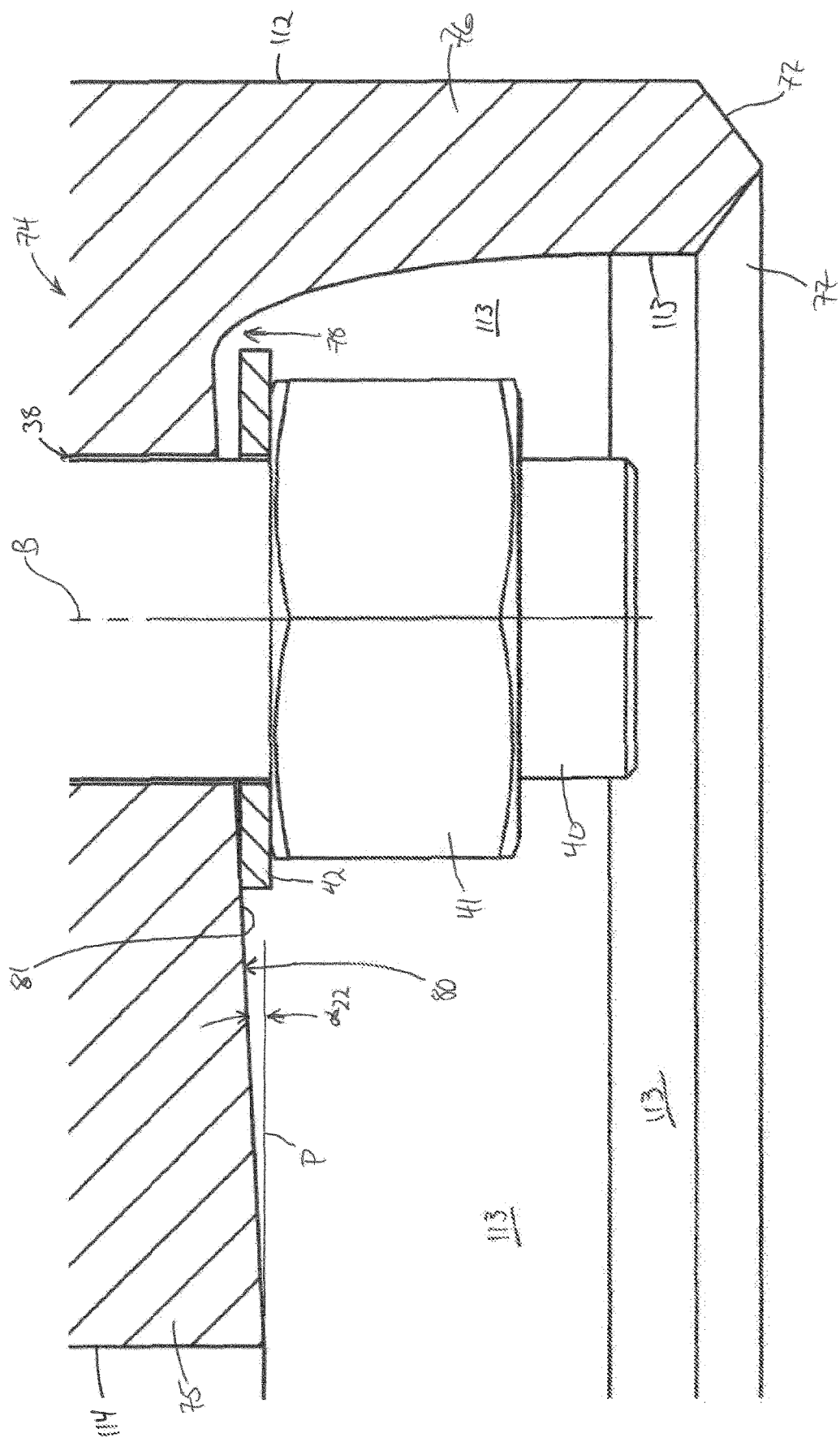
FIG. 6b shows an enlarged cutout of FIG. 4 showing the second rear surface angle in more detail.

The first flange element 50 and the second flange element 74 are connected to each other with a number of bolts 40 and nuts 41 as shown in FIGS. 4-7. Every bolt 40 is passed through corresponding bolt holes 38 (see FIGS. 2 and 4-7) in the first flange part 51 and the second flange part 75. Washers 42 are optionally arranged on either end of the bolts 40 and a nut 41 are screwed on the bolts 40 on either end of the bolts 40. The nuts 41 are tightened until a desired tension in the bolts 40 and the flange connection 92 is achieved. In FIGS. 4 and 5 the flange connection 92 is shown before the bolts have been tensioned. The first flange heel 64 rest on the second flange heel 88 while there is a gap between the first flange wedge 62 and the second flange wedge 86. As can be clearly seen on FIGS. 6a and 6b the washers 42 at either end of the bolts 40 and the first rear surface 57 and the second rear surface 81 respectively are not parallel. As the nuts 41 are screwed further onto the bolts 40 the first flange part 51 and the second flange part 75 are rotated towards each other until the first flange wedge 62 rest against the second flange wedge 86. As long as the first rear surface 57 and the first flange wedge surface 63 are substantially parallel, and the second rear surface 81 and the second flange wedge surface 87 are substantially parallel, substantially the entire first flange wedge surface 63 will rest or abut against the entire second flange wedge surface 87 when the first flange part 51 has been rotated through an angle equal to the first rear surface angle $\alpha_{21}$/first wedge surface angle $\alpha_{11}$ and the second flange part 75 has been rotated through an angle equal to the second rear surface angle $\alpha_{22}$/second wedge surface angle $\alpha_{12}$. This is situation is clearly shown in FIG. 7.

The fact that the first rear surface angle $\alpha_{21}$ is substantially equal to the first wedge surface angle $\alpha_{11}$ and that the second rear surface angle $\alpha_{22}$ is substantially equal to the second wedge surface angle $\alpha_{12}$ means that as the first and second flange parts 51, 75 have been rotated until the first flange wedge surface 63 and the second flange wedge surface 87 are in contact during pre-tensioning of the bolts 40 of the flange connection 92 as can be seen in FIGS. 4-5 and 6a-b (before tensioning of the bolts 40) and in FIG. 7 (after the bolts 40 have been tensioned), the first rear surface 57 of the first rear side 56 and the second rear surface 81 of the second rear side 80 are both substantially parallel to the plane P mentioned above that is perpendicular to the longitudinal axis A of the flange connection 92, and the nuts 41, or optionally the washers 42, will rest firmly on the first rear surface 57 of the first flange part 51 and second rear surface 81 of the second flange part 75 so that no bending moment and resulting bending stresses are created in the bolts 40 or the first and second flange parts 51, 75 when the bolts 40 are pre-tensioned. Furthermore, since the first flange part 51 and the second flange part 75 are rotated before the first flange wedge surface 63 and the second flange wedge surface 87 are in contact while the radially outer parts of the first flange heel surface 65 and the second flange heel surface 89 are in contact from the start of the tensioning of the bolts as indicated in FIG. 7, a larger compressing force pressing the first flange heel 64 and the second flange heel 88 together is obtained and thereby a lesser chance of a gap occurring between the first and second flange heels 64, 88 due to external loads is also obtained, through which gap water might penetrate into the flange connection 92 and cause corrosion of the bolts 40.

The first wedge surface angle $\alpha_{11}$ and the second wedge surface angle $\alpha_{12}$ control the flange rotation during the pre-loading of the bolts 40 and they have several advantages. The first and second wedge surface angles $\alpha_{11}$ and $\alpha_{12}$ makes the first and second flange parts 51, 75 warp like a disc spring during assembly of the flange connection 92 and thereby the first and second flange parts 51, 75 are prestressed, dominated by hoop stresses. The warping pre-stress of the first and second flange parts 51, 75 ensures that the first and second flange parts 51, 75 do not loose contact outside the first and second flange recesses 66, 90 where the bolts 40 preferably are located, for any given tower design load which prevents water from penetrating into the annular opening formed by the first and second flange recesses 66, 90 and causing corrosion of the bolts 40 arranged in bolt holes 38. Furthermore, the internal pre-stress of the first and second flange parts 51, 75 causes separating forces on the nuts 41 that are screwed onto the bolts 40 in the flange connection 92, whereby the nuts 41 will not self-loosen due to vibrations or other dynamic loads. The bolt prestresses are static which provides superior fatigue properties. The static bolt stresses allow for higher bolt pre-stress and higher design load resistance of the flange element 20. Furthermore, there will be no prying effects on the bolts 40 before separation of the first and second flange elements 50, 74 occurs, which will happen when the loads exceed the design loads of the flange connection 92.

Furthermore, the first and second heel surface angles $\beta_1$ and $\beta_2$ create a local high contact stress distribution as mentioned above which provides a water tight seal between the first flange heel 64 and the second flange heel 88 to prevent water in the surroundings from penetrating into the flange connection 92 and thereby protecting the bolts 40 from getting corroded. It can also be mentioned that the first and second flange recesses 66, 90 in which the bolt holes are arranged, contributes to control the contact stress to desired areas of the first and second front surfaces 60, 84 of the first and second flange parts 51, 75 respectively.

The flange elements 20, 50, 74 and the flange connection 92 according to the present invention can be used to securely connect elements of various structure together. As shown in FIGS. 1 and 8 the flange connection 92 can for example be used to securely connect two adjacent tower sections 44, 68, 94, 100 of a tower structure 16 to each other. The tower structure 16 can be used to support various structures or devices such as a wind turbine 11 as shown in FIG. 1 comprising a nacelle 13 and wind turbine blades 12, or a water tank 15 as shown in FIG. 8.

The tower structure 16 shown in FIGS. 1 and 8 is shown with four tower sections, a first tower section 44, a second tower section 68, a third tower section 94 and a fourth tower section 100. Each tower section 44, 68, 94, 100 is made of a conical section with a substantially circular cross-section with a gradually smaller diameter from the ground 19 towards the top of the tower structure 16 where the wind turbine 11 is mounted to the tower structure 16. It should be mentioned that the flange connection 92 obviously also can be used with tower structure that have a constant diameter and, as mentioned above, with structures that do not necessarily have a circular cross-section.

The first tower section 44 has an upper part 45 where a first upper flange element 46 is mounted to the first tower section 44, and a lower part 47 where a first lower flange element 48 is mounted. The lower part 47 is securely attached to a support element 49 with the first lower flange element 48. The first upper and lower flange elements 46, 48 are flange elements as described in detail above and shown in FIGS. 2-7.

The second tower section 68 has an upper part 69 where a second upper flange element 70 is mounted to the second tower section 68, and a lower part 71 where a second lower flange element 72 is mounted to the second tower section 68.

The second upper and lower flange elements 70, 72 are as described in detail above and shown in FIGS. 2-7.

The third tower section 94 has an upper part 95 where a third upper flange element 96 is mounted to the third tower section 94, and a lower part 97 where a third lower flange element 98 is mounted to the third tower section 94. The third upper and lower flange elements 95, 97 are flange elements as described in detail above and shown in FIGS. 2-7.

The fourth tower section 100 has an upper part 101 where a fourth upper flange element 102 is mounted to the fourth tower section 100, and a lower part 103 where a fourth lower flange element 104 is mounted to the fourth tower section 100. The fourth upper and lower flange elements 102, 104 are as described in detail above and shown in FIGS. 2-7. The forth upper flange element 102 is further mounted to the nacelle 13 of the wind turbine 11.

The adjacent tower sections 44, 68; 68, 94; 94, 100 are connected to each other with a flange connection 92 according to the present invention.

The first upper flange element 46 and the second lower flange element 72 are connected to each other to form a flange connection 92 according to the present invention, thereby securely connecting the first tower section 44 to the second tower section 68.

The second upper flange element 70 and the third lower flange element 98 are connected to each other to form a flange connection 92 according to the present invention, thereby securely connecting the second tower section 68 and the third tower section 94.

The third upper flange element 96 and the fourth lower flange element 104 are connected to each other to form a flange connection 92 according to the present invention, thereby securely connecting the third tower section 94 and the fourth tower section 100.

The same tower structure 16 as described in detail above, is also shown in FIG. 8 where the tower structure 16 of a water tower 14 supports a water tank 15. As can be clearly seen on FIGS. 1 and 8, the flange connections 92 are arranged on the inside of the tower structure 16.

As described in detail above, the design of the present flange connection 92 will avoid fatigue in bolts 40 since bolt stresses will be static as a function of dynamic loads; additional bolt loads and local bending of bolts 40 due to prying effects on bolts is avoided since the first and second flange elements 50, 74 remain with face to face contact, also under extreme loads on the tower structure; nut loosening caused by vibrations and dynamic load due to the first and second flange parts 51, 75 warping pre-stressed condition is avoided; and water ingress causing corrosion of the bolts 40 is avoided since there is no flange separation axially on the outside of the bolts.

The invention has now been explained with reference to a non-limiting example. A person skilled in the art will, however, appreciate that modifications and changes may be made to this embodiment which will be within the scope of the invention as defined in the following claims.

The invention claimed is:

1. A flange element for a flange connection with a longitudinal centre axis, the flange element comprising:
   a flange part comprising a front side with a front surface, and
   an attachment part adapted for secure attachment to a tubular element comprising a tower section of a tower structure for a wind turbine or a pipe element that is part of an offshore load bearing structure, wherein the flange part is arranged radially on an inside of the flange element and is provided with a flange wedge and a flange recess, the flange wedge comprising:
a flange wedge surface that is part of the front surface, and
a flange heel comprising a flange heel surface that is part of the front surface,
wherein the flange recess extends around a circumference of the flange part and separates the flange wedge and the flange heel, and
wherein the flange wedge surface makes a wedge surface angle and the flange heel surface makes a heel surface angle with a plane that is perpendicular to the longitudinal centre axis of the flange element.

2. The flange element according to claim 1, wherein the wedge surface angle and the heel surface angle are different.

3. The flange element according to claim 1, wherein the wedge surface angle and the heel surface angle are equal.

4. The flange element according to claim 1, wherein a rear surface of a rear side of the flange part makes a rear surface angle with the plane that is perpendicular to the longitudinal centre axis of the flange element.

5. The flange element according to claim 4, wherein the wedge surface angle and the rear surface angle are equal.

6. The flange element according to claim 1, wherein flange part is provided with a plurality of bolt holes that passes through the flange part, the bolt holes having respective bolt hole openings that lead into the flange recess.

7. The flange element according to claim 1, wherein the flange element comprises a transition region on a radial inside of the flange element, between the attachment part and the flange part, the transition region being provided with an elliptical shape.

8. The flange element according to claim 1, wherein adjacent tower sections of a tower structure in an offshore installation are connected via the flange element.

9. A flange connection having a longitudinal centre axis, the flange connection comprising:
a first flange element comprising:
a first attachment part,
a first front side with a first front surface, and
a first flange part, and
a second flange element comprising:
a second attachment part,
a second front side with a second front surface, and
a second flange part,
wherein the first attachment part and the second attachment part are adapted for secure attachment to a tubular element comprising a tower section of a tower structure for a wind turbine or a pipe element that is part of an offshore load bearing structure,
wherein the first flange part and the second flange part are adapted to be arranged radially on an inside of the tower structure or the offshore load bearing structure,
wherein the first flange part is provided with a first flange wedge comprising:
a first flange wedge surface that is part of the first front surface, and
a first flange heel comprising a first flange heel surface that is part of the first front surface,
wherein the first flange wedge surface makes a first wedge surface angle and the first flange heel surface makes a first heel surface angle with a plane that is perpendicular to the longitudinal centre axis of the flange connection,
wherein the second flange part is provided with a second flange wedge comprising:
a second flange wedge surface that is part of the second front surface, and
a second flange heel comprising a second flange heel surface that is part of the second front surface,
wherein the second flange wedge surface makes a second wedge surface angle and the second flange heel surface makes a second heel surface angle with the plane,
wherein the first flange element and the second flange element are adapted to be securely and disconnectably connected to each other, and
wherein the first flange element is provided with a first flange recess that extends around a circumference of the first flange element and separates the first flange wedge and the first flange heel, and the second flange element is provided with a second flange recess that extends around the circumference of the second flange element and separates the second flange wedge and the second flange heel.

10. The flange connection according to claim 9, wherein the first wedge surface angle and the second wedge surface angle are equal.

11. The flange connection according to claim 9, wherein the first wedge surface angle and the second wedge surface angle are different.

12. The flange connection according to claim 9, wherein the first heel surface angle and the second heel surface angle are equal.

13. The flange connection according to claim 9, wherein the first heel surface angle and the second heel surface angle are different.

14. The flange connection according to claim 9, wherein the first flange wedge surface of the first flange wedge is in contact with the second flange wedge surface of the second flange wedge when the first flange element and the second flange element are securely connected to each other.

15. The flange connection according to claim 9, wherein the first flange heel surface of the first flange heel is in contact with the second flange heel surface of the second flange heel when the first flange element and the second flange element are securely connected to each other.

16. The flange connection according to claim 9, wherein a first rear surface of a first rear side of the first flange part makes a first rear surface angle with the plane that is perpendicular to the longitudinal centre axis of the flange connection, and that a second rear surface of a second rear side of the second flange part makes a second rear surface angle with the plane.

17. The flange connection according to claim 16, wherein the first wedge surface angle and the first rear surface angle are equal, and that the second wedge surface angle and the second rear surface angle are equal.

18. The flange connection according to claim 9, wherein the first flange element is provided with a number of bolt holes that passes through the first flange part of the first flange element, the bolt holes having respective bolt hole openings that lead into the first flange recess, and wherein the second flange element is provided with a same number of bolt holes that passes through the second flange part of the second flange element, the bolt holes having respective bolt hole openings that lead into the second flange recess, whereby bolts can be passed through corresponding bolt holes in the first flange element and the second flange element.

19. The flange connection according to claim 9, wherein the first flange element comprises a first transition region on a radial inside of the first flange element, between the first attachment part and the first flange part, the first transition region being provided with an elliptical shape, and the second flange element comprises a second transition region on a radial inside of the second flange element, between the second attachment part and the second flange part, the second transition region being provided with an elliptical shape.

20. The flange connection according to claim 9, wherein the tower structure comprises at least a first tower section and a second tower section, where the first tower section and the second tower section are securely connected to each other with the flange connection.

21. The flange connection according to claim 20, wherein the tower structure comprises more than two tower sections where all adjacent tower sections are securely attached to each other respectively with the flange connection.

* * * * *